United States Patent [19]
Omori et al.

[11] Patent Number: 5,439,853
[45] Date of Patent: Aug. 8, 1995

[54] MIXED OXIDE COMPOSITE CERAMICS AND METHOD OF PRODUCING THE SAME

[76] Inventors: Mamoru Omori, 1-1-42, Takamori, Izumi-ku; Toshio Hirai, 3-4-91, Takamori, Izumi-ku, both of Sendai-shi, Miyagi 981-31, Japan

[21] Appl. No.: 64,179
[22] PCT Filed: Sep. 28, 1992
[86] PCT No.: PCT/JP92/01237
  § 371 Date: May 25, 1993
  § 102(e) Date: May 25, 1993
[87] PCT Pub. No.: WO93/06060
  PCT Pub. Date: Jan. 4, 1993

[30] Foreign Application Priority Data

Sep. 26, 1991 [JP] Japan .................. 3-273603
Sep. 26, 1991 [JP] Japan .................. 3-273604
Sep. 26, 1991 [JP] Japan .................. 3-273605

[51] Int. Cl.$^6$ .................................. C04B 35/51
[52] U.S. Cl. ........................................... 501/89
[58] Field of Search ............. 501/89, 97, 98; 57/295

[56] References Cited

U.S. PATENT DOCUMENTS

| | | | |
|---|---|---|---|
| 4,264,548 | 4/1981 | Ezis | 264/65 |
| 4,426,209 | 1/1984 | Sarin et al. | 51/295 |
| 4,431,431 | 2/1984 | Sarin et al. | 51/295 |
| 4,830,800 | 5/1989 | Thomas et al | 264/65 |
| 4,830,991 | 5/1989 | Matsui | 501/97 |
| 5,030,599 | 7/1991 | Quadir et al. | 501/98 |

FOREIGN PATENT DOCUMENTS 101468 10/1985 Japan .
227968 10/1986 Japan .
311365 12/1990 Japan .

OTHER PUBLICATIONS

Communications of the American Ceramic Society, Pressureless Sintering of SiC, Mamoru Omori and Humihiko Takei, C-92 Jun. 1982.
Journal of Materials Science, Preparation of pressureless-sintered SiC-$Y_2O_3$-$Al_2O_3$, Mamoru Omori and Humihiko Takei, 3744-3749 (23) 1988, no month.

*Primary Examiner*—Mark L. Bell
*Assistant Examiner*—A. Wright
*Attorney, Agent, or Firm*—Dvorak and Traub

[57] ABSTRACT

In order to provide a mixed oxide ceramic sintered body having no defect such as void and pore, and high strength, toughness and reliability, a mixed oxide of rare earth oxide-alumina oxide added with silica is fired with a non-oxide mixture of SiC and/or $Si_3N_4$. In the production method, the crystal grain size of the sintered body is controlled to not more than 30 μm, and abnormal grain growth and occurrence of pore can be restrained to easily produce a practically usable mixed oxide ceramic sintered body having excellent toughness inherent to oxide sintered body and excellent high-temperature strength inherent to SiC and $Si_3N_4$ and uniform structure.

26 Claims, 1 Drawing Sheet

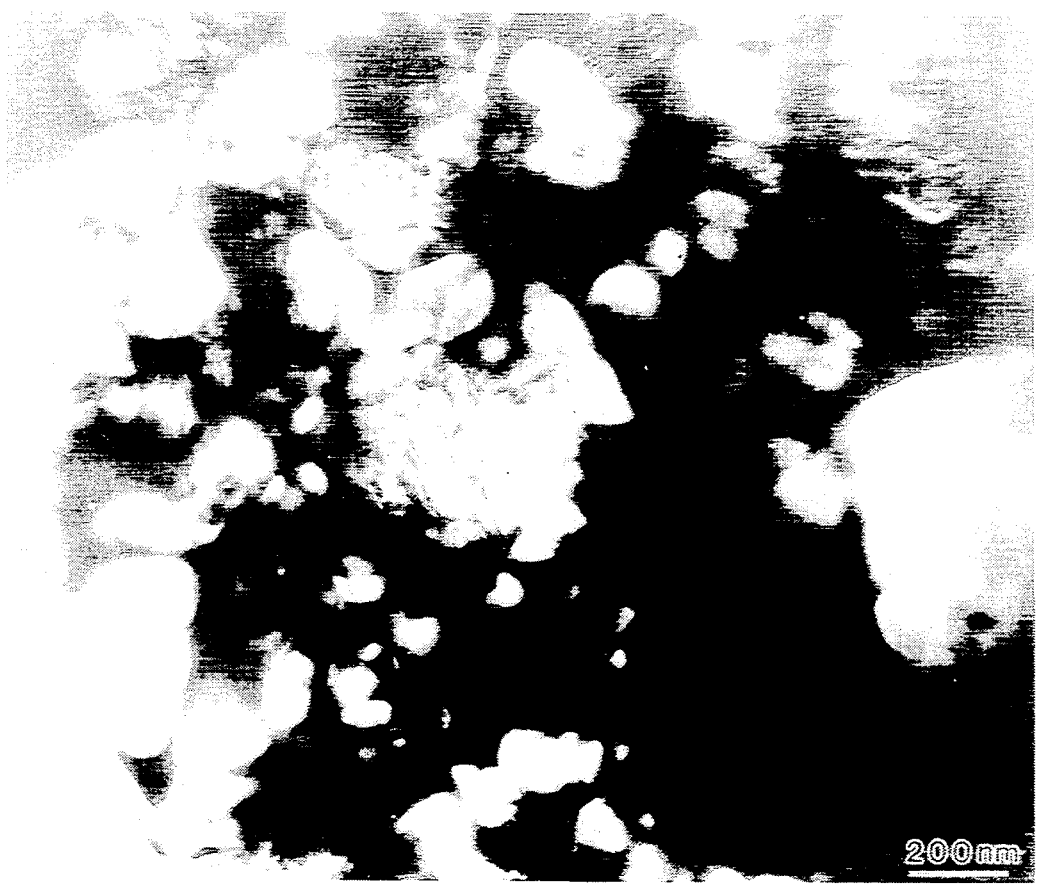

MIXED OXIDE COMPOSITE CERAMICS AND METHOD OF PRODUCING THE SAME

TECHNICAL FIELD

This invention relates to a mixed oxide ceramic sintered body having high strength, excellent toughness and high reliability and no defect such as pore, microcrack and the like as well as a method of producing the same, and particularly to (Ln—Al—Si) oxide composite ceramics (Ln is one or more rare earth elements and a mixture thereof) having a uniform structure and a technique for producing the same.

BACKGROUND ART

In general, ceramic materials are large in the strength at high temperature, and excellent in the heat resistance, oxidation resistance and corrosion resistance, so that they are particularly desirable as a structural material. Especially, a great interest is taken in the application of such ceramics as a structural material used in a temperature region exceeding a use limit of a metal. Among these ceramics, silicon carbide (abbreviated as SiC hereinafter) or silicon nitride (abbreviated as $Si_3N_4$ hereinafter) is excellent in the heat resistance and oxidation resistance, so that it is very desirable as a structural material capable of using at a high temperature.

However, SiC or $Si_3N_4$ is hardly sintered, and is a material that it is very difficult to provide a dense sintered body without adding an assistant. For this end, the firing has hitherto been conducted by adding $Al_2O_3$ as a sintering aid to SiC powder, or by adding $Y_2O_3$, $CeO_2$, $Al_2O_3$, AlN, MgO or the like as a sintering aid to $Si_3N_4$ powder.

Therefore, the SiC sintered body obtained by using $Al_2O_3$ or the like as a sintering aid becomes dense through liquid-phase sintering, but pores are apt to be generated owing to the reaction between $Al_2O_3$ and SiC. As a result, the strength is not more than 600 MPa and the toughness value at break is 5 MPa.m$^{\frac{1}{2}}$, and a m-value of Weibble distribution as an indication showing the reliability of ceramics is not more than 10, so that it could be said to be a poor reliability material.

On the other hand, the $Si_3N_4$ sintered body obtained by using $Y_2O_3$, $CeO_2$, $Al_2O_3$, AlN, MgO or the like as a sintering aid is dense and large in the strength, but is low in the toughness as compared with zirconia ceramics. As a result, the $Si_3N_4$ sintered body having a large strength at high temperature, an excellent oxidation resistance and the like is a material having a poor reliability in use as a structural material because the toughness is still low.

On the contrary, a part of the inventors has previously proposed a technique that the strength and toughness value and reliability of the SiC sintered body are improved by composing SiC with other ceramics. For example, a technique of producing a dense SiC-rare earth oxide-alumina composite sintered body through pressureless sintering is proposed by Omori, Takei and so on in J. Am. Ceram. Soc., 65 (1982) C-92. Further, there is proposed a technique of producing a dense SiC-rare earth oxide-alumina composite sintered body by raising the firing temperature in the pressureless sintering to 2150° C. to form Al metal and Si semiconductor (see J. Mater. Sci., 23 (1988) 3744–3749 by Omori and Takei).

As a means for increasing the toughness of the $Si_3N_4$ sintered body, a technique of improving the strength and toughness value and reliability of the $Si_3N_4$ sintered body by anisotropically growing $Si_3N_4$ crystal is proposed by Kawashima et al (see Takeshi Kawashima, Hiromi Okamoto, Hideharu Yamamoto and Akira Kitamura, Silicon Nitride Ceramics 2, Uchidarokauho, p135–146). That is, such a proposed technique is a method of improving the toughness of $Si_3N_4$-rare earth oxide-alumina composite sintered body using $Y_2O_3$ and $Al_2O_3$ as a sintering aid by placing a green shaped body in a capsule and sintering it under a gas pressure to anisotropically grow $Si_3N_4$ crystal.

In the SiC sintered body synthesized by the conventional technique, small defects are always existent in the inside of the sintered body, from which breakage is started, so that such a sintered body is still lacking in the reliability as a material and has a great problem in the practical use.

On the other hand, the conventional technique of producing the $Si_3N_4$ sintered body is a method of sintering in the capsule under gas pressure, so that the material adaptable as the capsule is less. Further, the green shaped body is housed in the capsule, so that the sintering of the complicated shape can not be conducted and the production coat becomes high. Moreover, in the $Si_3N_4$ sintered body synthesized by this method, the crystal anisotropically and largely grows, so that a large defect is existent in the inside of the sintered body, from which the breakage is started, and consequently it is still lacking in the reliability as the material and has a great problem in the practical use.

In order to solve the above problems of the conventional techniques, the inventors have mainly made studies with respect to the formation mechanism of SiC (or $Si_3N_4$)-rare earth oxide-alumina sintered body. As a result, the following facts have been found.

That is, an oxide solid solution or an oxide compound is firstly formed from rare earth oxide and alumina at a first stage of pressureless sintering. At a second stage, SiC or $Si_3N_4$ solutes and diffuses into the oxide to conduct the growth of SiC grains or $Si_3N_4$ grains, which are shrunk into the dense sintered body.

In the second stage of such a formation course, SiC powder or $Si_3N_4$ powder solutes into the oxide and at the same time causes a chemical reaction. SiC or $Si_3N_4$ is decomposed by the reaction with alumina to generate gases such as CO, $CO_2$, NO and the like. As a result, defects such as void, pore and the like are created in the sintered body, and the strength of the boundary between SiC or $Si_3N_4$ and oxide lowers.

An object of the invention is to provide a high-strength and high-reliability sintered body having no defect such as void, pore and the like in the mixed oxide composite ceramics obtained by firing SiC and/or $Si_3N_4$ and rare earth oxide—alumina oxide and to propose a novel technique on a method of advantageously producing the same.

DISCLOSURE OF INVENTION

The mixed oxide composite ceramics according to the invention is characterized by mixing silica with a mixed oxide ceramics fired from SiC and/or $Si_3N_4$ and rare earth oxide-alumina oxide, which is obtained by firing a mixture of rare earth oxide-alumina-silica mixed oxide and SiC and/or $Si_3N_4$. In the firing of such a compounded powders, silica is soluted in the oxide, so that the reaction rate of forming a solid solution of silica through the reaction between SiC or $Si_3N_4$ and the oxide becomes small as compared with the case of not soluting silica into the oxide. Therefore, the reaction between SiC or $Si_3N_4$ and the oxide is controlled. As a result, the formation of pores is decreased and the sintering of SiC or $Si_3N_4$ and the oxide is slowly promoted and hence the dense sintered body is easily obtained.

The invention is based on the aforementioned basic thinking and lies in a mixed oxide composite ceramics being a sintered body of at least one non-oxide of SiC and $Si_3N_4$ and a mixed oxide of rare earth oxide, alumina and silica.

Preferably, the mixed oxide composite ceramics is a sintered body of 95–5 wt % of at least one non-oxide of SiC and $Si_3N_4$ and 5–95 wt % of a mixed oxide consisting of 95–5 wt % of rare earth oxide, 4.9–94.9 wt % of alumina and 0.1–10 wt % of silica. When the non-oxide consists of SiC and $Si_3N_4$, it is preferable that the composition of the non-oxide is 90–5 wt % of SiC and 10–95 wt % of $Si_3N_4$.

More particularly, the mixed oxide composite ceramics is a sintered body of 95–5 wt % of at least one non-oxide of SiC and $Si_3N_4$ and 5–95 wt % of a mixed oxide consisting of 64.9–89.9 wt % of rare earth oxide, 10–35 wt % of alumina and 0.1–10 wt % of silica. Especially, the mixed oxide composite ceramics is a sintered body consisting of 80–20 wt % of the non-oxide and 20–80 wt % of the mixed oxide.

The mixed oxide may be an oxide consisting of a $Ln_4Al_2O_9$ compound (Ln is Y, Sm, Eu, Gd, Tb, Dy, Ho, Er, Tm, Yb, Lu and a mixture thereof, and so forth on, provided that La, Ce, Pr or Nd-containing compound is omitted because it is not known) or $LnAlO_3$ compound (Ln is Y, La, Ce, Pt, Nd, Sm, Eu, Gd, Tb, Dy, Ho, Er, Tm, Yb, Lu and a mixture thereof, and so forth on) and silica.

Preferably, the mixed oxide is an oxide consisting of 99.9–90 wt % of $Ln_4Al_2O_9$ compound or $LnAlO_3$ compound and 0.1–10 wt % of silica.

Such mixed oxide composite ceramics can be produced by the following method. That is, the method of producing the mixed oxide composite ceramics which comprises the steps of:

(a) a step of mixing SiC with a mixed oxide powder of rare earth oxide, alumina and silica;
(b) a step of shaping the resulting mixed raw powder into a green shaped body of a given shape;
(c) a step of heating the resulting green shaped body in a non-oxidizing atmosphere at a temperature rising rate of 5°–2000° C./minute; and
(d) a step of firing the green shaped body within a temperature range of 1500°–1900° C. for 0.1–600 minutes; or comprises the steps of:
(a) a step of mixing $Si_3N_4$ with a mixed oxide powder of rare earth oxide, alumina and silica;
(b) a step of shaping the resulting mixed raw powder into a green shaped body of a given shape;
(c) a step of heating the resulting green shaped body in a non-oxidizing atmosphere at a temperature rising rate of 5°–2000° C./minute; and
(d) a step of firing the green shaped body within a temperature range of 1600°–2100° C. for 0.1–600 minutes; or comprises the steps of:
(a) a step of mixing SiC and $Si_3N_4$ with a mixed oxide powder of rare earth oxide, alumina and silica;
(b) a step of shaping the resulting mixed raw powder into a green shaped body of a given shape;
(c) a step of heating the resulting green shaped body in a non-oxidizing atmosphere at a temperature rising rate of 5°–2000° C./minute; and
(d) a step of firing the green shaped body within a temperature range of 1600°–2100° C. for 0.1–600 minutes.

In these methods, the mixed raw powder is a mixture of 95–5 wt % of at least one non-oxide of SiC and $Si_3N_4$ and 5–95 wt % of a mixed oxide consisting of 95–5 wt % of rare earth oxide, 4.9–94.9 wt % of alumina and 0.1–10 wt % of silica. Furthermore, when the non-oxide consists of SiC and $Si_3N_4$, the composition of the non-oxide is 90–5 wt % of SiC and 10–95 wt % of $Si_3N_4$.

Preferably, the mixed raw powder is a mixture of 95–5 wt % of at least one non-oxide of SiC and $Si_3N_4$ and 5–95 wt % of a mixed oxide consisting of 64.9–89.9 wt % of rare earth oxide, 10–35 wt % of alumina and 0.1–10 wt % of silica.

More particularly, the mixed raw powder is a mixture of 80–20 wt % of the non-oxide and 20–80 wt % of the mixed oxide.

In the method of producing the mixed oxide composite ceramics according to the invention, the mixed oxide is preferably a mixture of $Ln_4Al_2O_9$ or $LnAlO_3$ as a main ingredient and silica, whose compounding ratio is 99.9–90 wt % of $Ln_4Al_2O_9$ compound or $LnAlO_3$ compound and 0.1–10 wt % of silica.

Furthermore, In the firing according to the method of the invention, it is preferable that the range of the proper firing temperature is 1650°–2000° C. and the firing time is 1–60 minutes and the temperature rising rate is 50°–1000° C./minute.

In the method of the invention, it is preferable to use SiC and $Si_3N_4$ of powder or whisker.

According to the mixed oxide composite ceramics of the invention and the method of producing the same, the problems of the aforementioned conventional techniques can effectively be solved.

That is, it has hitherto been considered that silica added to the other oxide ceramics is as low as 1550° C. in the melting point and precipitates in grain boundary at a vitreous state to lower the high-temperature strength, so that silica is rather a compound not wishing to be added.

However, according to the inventors' knowledge, silica effectively acts to obtain the dense sintered body when being added to the other compound and is effective to improve the strength and toughness of the oxide portion in the sintered body.

Therefore, according to the invention, silica is added to the mixture of SiC and/or $Si_3N_4$ and a mixed oxide (rare earth oxide-alumina-silica powder). As a result, the sintering becomes easy and also silica solutes into rare earth oxide-alumina without precipitating at the grain boundary to form glass, or when it existent in an amount exceeding the solid soluted amount, it reacts with rare earth oxide or alumina to form silicate compound. Therefore, it is found that the mixed oxide composite ceramics according to the invention does not cause a problem of lowering the high-temperature strength.

Moreover, a slight amount of silica existing on the surface of SiC or $Si_3N_4$ not subjected to oxidation treatment does not develop the aforementioned effect and is insufficient to increase the strength and toughness of the oxide.

Therefore, in order to obtain the mixed oxide composite ceramics having no defect such as pore, void or the like and high strength, excellent toughness and high reliability, according to the invention, the sintered body consisting of 95–5 wt % of at least one non-oxide of SiC and Si$_3$N$_4$ and 5–95 wt % of mixed oxide of 95–5 wt % of rare earth oxide, 4.9–94.9 wt % of alumina and 0.1–10 wt % of silica is formed to control the average crystal grain size of the sintered body to not more than 30 μm.

In general, the strength of the ceramics considerably lowers when the crystal grain size of the constituting particles exceeds 50 μm. Therefore, in order to obtain a high-strength ceramic material, the crystal grain size should be restricted to not more than 50 μm. According to the invention, the average crystal grain size of the constituting particles is rendered into not more than 30 μm, so that the maximum grain size is not more than 50 μm and hence the average crystal grain size is controlled to not more than 30 μm, preferably not more than 10 μm.

The production method of the mixed oxide composite ceramics according to the invention will be described below.

That is, the method of producing the mixed oxide composite ceramics according to invention comprises the steps of:

(a) a step of mixing SiC and/or Si$_3$N$_4$ with a mixed oxide powder of rare earth oxide, alumina and silica;

(b) a step of shaping the resulting mixed raw powder into a green shaped body of a given shape;

(c) a step of heating the resulting green shaped body in a non-oxidizing atmosphere at a temperature rising rate of 5°–2000° C./minute; and (d) a step of firing the green shaped body within a temperature range of 1500°–1900° C. for 0.1–600 minutes.

In the production method of the invention, the mixed raw powder is a mixture of 95–5 wt % of at least one non-oxide of SiC and Si$_3$N$_4$ and 5–95 wt % of a mixed oxide consisting of 95–5 wt % of rare earth oxide, 4.9–94.9 wt % of alumina and 0.1–10 wt % of silica.

In this method, the mixed raw oxide is preferably a mixture of Ln$_4$Al$_2$O$_9$ compound or LnAlO$_3$ compound and silica, in which it favorably consists of 99.9–90 wt % of Ln$_4$Al$_2$O$_9$ compound or LnAlO$_3$ compound and 0.1–10 wt % of silica.

The compounding ratio of rare earth oxide and alumina is 95–5 wt % of rare earth oxide and 4.9–94.9 wt % of alumina. This is due to the fact that when the rare earth oxide powder is less than 5 wt %, the properties of the mixed oxide are biased toward the properties of the alumina alone and the sintering property of SiC and/or Si$_3$N$_4$ is poor, while when the alumina powder is less than 4.9 wt %, the properties of the mixed oxide are biased toward the properties of the rare earth oxide alone and the sintering property of SiC and/or Si$_3$N$_4$ is poor. Furthermore, when the amount of rare earth oxide exceeds 95 wt %, it is too large and SiC and/or Si$_3$N$_4$ is poor, while when the amount of alumina exceeds 94.9 wt %, the properties of rare earth oxide are lost.

Preferably, the compounding ratio of rare earth oxide and alumina is 64.9–89.9 wt % of rare earth oxide and 10–35 wt % of alumina. Because, it is desirable that the sintered body according to the invention is a composition producing Ln$_4$Al$_2$O$_9$ or LnAlO$_3$ compound or is near to this composition in order to effectively develop its properties.

In the production method of the invention, the amount of silica added is 0.1–10 wt %. This is due to the fact that when the amount of silica is less than 0.1 wt %, the abnormal growth of crystal grains in the sintered body can not be controlled and the strength and toughness of the oxide portion in the sintered body are small and the dense sintered body can not be obtained, while when the amount of silica exceeds 10 wt %, the addition effect is unchangeable but silica powder larger than its solid-soluting amount reacts with the rare earth oxide or alumina powder to undesirably form a silicate compound.

In the production method of the invention, the compounding ratio of the mixed oxide and SiC and/or Si$_3$N$_4$ is 5–95 wt % of the mixed oxide and 95–5 wt % of SiC and/or Si$_3$N$_4$. This is due to the fact that when the amount of the mixed oxide is less than 5 wt %, the sintering property with SiC and/or Si$_3$N$_4$ is poor and the dense sintered body can not be obtained. On the other hand, when the amount of SiC and/or Si$_3$N$_4$ is less than 5 wt %, or when the amount of the mixed oxide exceeds 95 wt %, the sintered body having excellent hardness and high-temperature strength by the addition effect of SiC and/or Si$_3$N$_4$ can not be obtained.

Preferably, the compounding ratio of the mixed oxide and SiC and/or Si$_3$N$_4$ is 20–80 wt % of the mixed oxide and 80–20 wt % of SiC and/or Si$_3$N$_4$.

In the production method of the invention, powder or whisker is favorably used as SiC and Si$_3$N$_4$.

As the rare earth oxide (Ln$_2$O$_3$), there are preferably used, for example, Sc$_2$O$_3$, Y$_2$O$_3$, La$_2$O$_3$, CeO$_2$, Pr$_2$O$_3$, Nd$_2$O$_3$, Sm$_2$O$_3$, Eu$_2$O$_3$, Gd$_2$O$_2$, Tb$_4$O$_7$, Dy$_2$O$_3$, Ho$_2$O$_3$, Er$_2$3O$_3$, Tm$_2$O$_3$, Yb$_2$O$_3$ and Lu$_2$O$_3$.

Moreover, in the production method of the invention, when the mixed oxide is mixed with SiC powder and/or Si$_3$N$_4$ powder or SiC whisker and/or Si$_3$N$_4$ whisker, usual machines used in the mixing or kneading of powder can be used. This mixing may be dry type or wet type. In case of wet type mixing, a surfactant such as ethylamine, fish oil or the like may be used to effectively conduct the mixing.

The thus obtained mixed raw powder is dried, if necessary, and subsequently shaped into a green shaped body of a given form. In this shaping step, an organic high polymer (polyethylene glycol, polyvinyl alcohol or the like} as a shaping assistant is added to the mixed raw powder and can be shaped by applying a known shaping technique according to usual manner.

In the production method of the mixed oxide composite ceramics according to the invention, the range of proper firing temperature is 1600°–2100° C. This is due to the fact that when the firing temperature is lower than 1600° C., the sintering is insufficient and the dense sintered body can not be obtained, while when it is higher than 2100° C., SIC reacts with alumina to form pores and the densification is not conducted. The preferable firing temperature is within a range of 1650°–2000° C.

In the production method of the invention, the firing time is a range of 0.1–600 minutes. In connection with the above firing temperature, it is long when the firing temperature is low, while it is short when the firing temperature is high. This is due to the fact that when the firing time is less than 0.1 minute, the sintering is insufficient and the dense sintered body can not be obtained, while when it exceeds 600 minutes, the sintering effect is substantially unchangeable or SiC reacts with alumina to form pores. The preferable firing time is within a range of 1–60 minutes.

In the production method of the invention, the temperature rising rate in the firing is within a range of 5°–2000° C./minute. This is due to the fact that even when the rate is slower than 5° C./minute, the sintered body is obtained but SiC or $Si_3N_4$ reacts with oxide to form pores and lower the density, while the temperature rising of more than 2000° C./minute is actually impossible. The preferable temperature rising rate is within a range of 50°–1000° C./minute.

As the atmosphere in the firing, SiC is oxidized in an oxidizing atmosphere, so that a non-oxidizing atmosphere (e.g. an inert gas such as nitrogen gas, argon gas, helium gas or the like). Further, the firing may be carried out under vacuum.

In the thus obtained (Ln, Al, Si) oxide composite ceramics according to the invention, SiC and/or $Si_3N_4$ and oxide are well sintered, and the toughness and strength of the oxide are considerably improved. The strength and toughness are larger by not less than 50% than those of the conventional one having no silica.

The aforementioned technique of producing the high-temperature usable mixed oxide composite ceramics having improved strength and toughness by firing oxide containing silica and SiC and/or $Si_3N_4$ is particularly effective for $Ln_4Al_2O_9$ or $LnAlO_3$ compound producing martensitic transformation during the firing. That is, 5–95 wt % of the mixed oxide consisting of 99.9–90 wt % of $Ln_4Al_2O_9$ compound or $LnAlO_3$ compound and 0.1–10 wt % of silica is mixed with 95–5 wt % of SiC powder and/or $Si_3N_4$ powder or SiC whisker and/or $Si_3N_4$ whisker or a mixture thereof and synthesized according to the above method to form $Ln_4Al_2O_9$ oxide sintered body or $LnAlO_3$ oxide sintered body, which does not produce twin through martensitic transformation and has excellent strength and toughness because the crystal grain size is controlled to not more than 30 μm.

This is considered due to the fact that twin is not produced in the constituting particles of the sintered body and few twin is first produced accompanied with the growth of cracks to absorb strain energy and also the strain energy can be absorbed by the motion of twin face, whereby the strength and toughness of the sintered body are increased. This fact is a mechanism for increasing toughness, which has never been known in the conventional technique, and is a novel knowledge discovered by the inventors.

BRIEF DESCRIPTION OF DRAWING

FIG. 1 is a transmission electron microscopic photograph showing a crystal structure of a mixed oxide ceramic sintered body according to the invention.

BEST MODE FOR CARRYING OUT THE INVENTION

Example 1

(1) A mixed powder of 60 g of SiC powder, 71.2 g of $Y_2O_3$ powder, 16.1 g of $Al_2O_3$ powder and 2.7 g of $SiO_2$ powder is charged into a 140 ml of ethyl alcohol and then 2 ml of diethylamine is added, which are wet mixed in a ball mill for 48 hours.

(2) The mixture is heated to 60° C. to evaporate alcohol and charged into an aqueous solution of 5% polyethylene glycol, which is further mixed with stirring and dried and shaped into a green shaped body having a size of $45 \times 20 \times 5$ mm$^3$.

(3) The green shaped body is heated to 500° C. in air at a temperature rising rate of 2° C./minute and calcined at 500° C. for 2 hours.

(4) The calcined material is heated to 1775° C. in a nitrogen gas at a temperature rising rate of 50° C./minute and held at 1775° C. for 10 minutes to obtain a sintered body.

The resulting sintered body is a dense sintered body and pores are not hardly observed. Further, the sintered body has a bending strength of 800 MPa and a toughness value at break of $K_{IC}=10$ MP.m$^{\frac{1}{2}}$.

Example 2

(1) A mixed powder of 49.75 g of SiC powder, 44.05 g of $Yb_2O_3$ powder, 5.70 g of $Al_2O_3$ powder and 0.5 g of $SiO_2$ powder is charged into a 90 ml of ethyl alcohol and then 1 ml of diethylamine is added, which are wet mixed in a ball mill for 48 hours.

(2) The mixture is heated to 60° C. to evaporate alcohol and charged into an aqueous solution of 5% polyethylene glycol, which is further mixed with stirring and dried and shaped into a green shaped body having a size of $45 \times 20 \times 5$ mm$^3$.

(3) The green shaped body is heated to 500° C. in air at a temperature rising rate of 2° C./minute and calcined at 500° C. for 2 hours.

(4) The calcined material is heated to 1830° C. in a nitrogen gas at a temperature rising rate of 100° C./minute and held at 1830° C. for 5 minutes to obtain a sintered body.

The resulting sintered body is a dense sintered body and pores are not hardly observed. Further, the sintered body has a bending strength of 900 MPa and a toughness value at break of $K_{IC}=10$ MP.m$^{\frac{1}{2}}$. Moreover, a transmission electron microscopic photograph of this material is shown in FIG. 1. As seen from this figure, it is confirmed that white SiC powder well bonds to an oxide matrix and is finely dispersed thereinto.

Example 3

(1) A mixed powder of 39.88 g of SiC powder, 52.45 g of $Gd_2O_3$ powder, 7.38 g of $Al_2O_3$ powder and 0.3 g of $SiO_2$ powder is charged into a 90 ml of ethyl alcohol and then 1 ml of diethylamine is added, which are wet mixed in a ball mill for 48 hours.

(2) The mixture is heated to 60° C. to evaporate alcohol and charged into an aqueous solution of 5% polyethylene glycol, which is further mixed with stirring and dried and shaped into a green shaped body having a size of $45 \times 20 \times 5$ mm$^3$.

(3) The green shaped body is heated to 500° C. in air at a temperature rising rate of 2° C./minute and calcined at 500° C. for 2 hours.

(4) The calcined material is heated to 1870° C. in a nitrogen gas at a temperature rising rate of 150° C./minute and held at 1870° C. for 10 minutes to obtain a sintered body.

The resulting sintered body is a dense sintered body and pores are not hardly observed. Further, the sintered body has a bending strength of 1100 MPa and a toughness value at break of $K_{IC}=12$ MP.m$^{\frac{1}{2}}$.

Example 4

(1) A mixed powder of 60 g of SiC powder, 32.64 g of $Y_2O_3$ powder, 5.76 g of $Al_2O_3$ powder and 1.6 g of $SiO_2$ powder is charged into a 90 ml of ethyl alcohol and then 1 ml of diethylamine is added, which are wet mixed in a ball mill for 48 hours.

(2) The mixture is heated to 60° C. to evaporate alcohol and charged into an aqueous solution of 5% polyethylene glycol, which is further mixed with stirring and dried and shaped into a green shaped body having a size of 45×20×5 mm$^3$.

(3) The green shaped body is heated to 500° C. in air at a temperature rising rate of 2° C./minute and calcined at 500° C. for 2 hours.

(4) The calcined material is heated to 1950° C. in a nitrogen gas at a temperature rising rate of 100° C./minute and held at 1950° C. for 10 minutes to obtain a sintered body.

The resulting sintered body is a dense sintered body and pores are not hardly observed. Further, the sintered body has a bending strength of 800 MPa and a toughness value at break of $K_{IC}=9$ MP.m$^{\frac{1}{2}}$.

Example 5

(1) A mixed powder of 90 g of SiC powder, 6.96 g of $Nd_2O_3$ powder, 2.10 g of $Al_2O_3$ powder and 0.93 g of $SiO_2$ powder is charged into a 90 ml of ethyl alcohol and then 1 ml of diethylamine is added, which are wet mixed in a ball mill for 48 hours.

(2) The mixture is heated to 60° C. to evaporate alcohol and charged into an aqueous solution of 5% polyethylene glycol, which is further mixed with stirring and dried and shaped into a green shaped body having a size of 45×20×5 mm$^3$.

(3) The green shaped body is heated to 500° C. in air at a temperature rising rate of 2° C./minute and calcined at 500° C. for 2 hours.

(4) The calcined material is heated to 1950° C. in an argon gas at a temperature rising rate of 60° C./minute and held at 1950° C. for 5 minutes to obtain a sintered body.

The resulting sintered body is a dense sintered body and pores are not hardly observed. Further, the sintered body has a bending strength of 650 MPa and a toughness value at break of $K_{IC}=7$ MP.m$^{\frac{1}{2}}$.

Example 6

(1) A mixed powder of 10 g of SiC powder, 78.74 g of $Ho_2O_3$ powder, 10.62 g of $Al_2O_3$ powder and 0.64 g of $SiO_2$ powder is charged into a 90 ml of ethyl alcohol and then 1 ml of diethylamine is added, which are wet mixed in a ball mill for 48 hours.

(2) The mixture is heated to 60° C. to evaporate alcohol and charged into an aqueous solution of 5% polyethylene glycol, which is further mixed with stirring and dried and shaped into a green shaped body having a size of 45×20×5 mm$^3$.

(3) The green shaped body is heated to 500° C. in air at a temperature rising rate of 2° C./minute and calcined at 500° C. for 2 hours.

(4) The calcined material is heated to 1800° C. in an argon gas at a temperature rising rate of 80° C./minute and held at 1800° C. for 10 minutes to obtain a sintered body.

The resulting sintered body is a dense sintered body and pores are not hardly observed. Further, the sintered body has a bending strength of 1000 MPa and a toughness value at break of $K_{IC}=11$ MP.m$^{\frac{1}{2}}$.

The SiC—(Ln—Al—Si) oxide sintered bodies obtained by the method of the invention are dense and have no pore and are constituted with particles having an average crystal grain size of not more than 30 μm. Furthermore, it is confirmed that the sintered body according to the invention has the strength and toughness value at break enough to be put into practical use, and particularly the toughness value at break is about 3 times that of the conventional SiC sintered body or the composite material thereof and the strength is 50% or more than that of the conventional one.

Example 7

(1) A mixed powder of 60 g of $Si_3N_4$ powder, 71.2 g of $Y_2O_3$ powder, 16.1 g of $Al_2O_3$ powder and 2.7 g of $SiO_2$ powder is charged into a 130 ml of ethyl alcohol and then 2 ml of diethylamine is added, which are wet mixed in a ball mill for 72 hours.

(2) The mixture is heated to 60° C. to evaporate alcohol and charged into an aqueous solution of 5% polyethylene glycol, which is further mixed with stirring and dried and shaped into a green shaped body having a size of 45×20×5 mm$^3$.

(3) The green shaped body is heated to 500° C. in air at a temperature rising rate of 2° C./minute and calcined at 500° C. for 2 hours.

(4) The calcined material is heated to 1650° C. under a pressure of a nitrogen gas of 9.8 kgf/cm$^2$ at a temperature rising rate of 50° C./minute and held at 1650° C. for 20 minutes to obtain a sintered body.

The resulting sintered body is a dense sintered body and pores are not hardly observed. Further, the sintered body has a bending strength of 1100 MPa and a toughness value at break of $K_{IC}=16$ MP.m$^{\frac{1}{2}}$.

Example 8

(1) A mixed powder of 80 g of $Si_3N_4$ powder, 17.01 g of $Gd_2O_3$ powder, 2.39 g of $Al_2O_3$ powder and 0.6 g of $SiO_2$ powder is charged into a 90 ml of ethyl alcohol and then 1.5 ml of diethylamine is added, which are wet mixed in a ball mill for 72 hours.

(2) The mixture is heated to 60° C. to evaporate alcohol and charged into an aqueous solution of 5% polyethylene glycol, which is further mixed with stirring and dried and shaped into a green shaped body having a size of 45×20×5 mm$^3$.

(3) The green shaped body is heated to 500° C. in air at a temperature rising rate of 2° C./minute and calcined at 500° C. for 2 hours.

(4) The calcined material is heated to 1750° C. under a pressure of a nitrogen gas of 9.8 kgf/cm$^2$ at a temperature rising rate of 80° C./minute and held at 1750° C. for 5 minutes to obtain a sintered body.

The resulting sintered body is a dense sintered body and pores are not hardly observed. Further, the sintered body has a bending strength of 1200 MPa and a toughness value at break of $K_{IC}=14$ MP.m$^{\frac{1}{2}}$.

Example 9

(1) A mixed powder of 67.9 g of $Si_3N_4$ powder, 22.33 g of $Nd_2O_3$ powder, 6.77 g of $Al_2O_3$ powder and 3.0 g of $SiO_2$ powder is charged into a 90 ml of ethyl alcohol and then 1.5 ml of diethylamine is added, which are wet mixed in a ball mill for 72 hours.

(2) The mixture is heated to 60° C. to evaporate alcohol and charged into an aqueous solution of 5% polyethylene glycol, which is further mixed with stirring and dried and shaped into a green shaped body having a size of 45×20×5 mm$^3$.

(3) The green shaped body is heated to 500° C. in air at a temperature rising rate of 2° C./minute and calcined at 500° C. for 2 hours.

(4) The calcined material is heated to 1800° C. under a pressure of a nitrogen gas of 5 kgf/cm$^2$ at a temperature rising rate of 50° C./minute and held at 1800° C. for 2 minutes to obtain a sintered body.

The resulting sintered body is a dense sintered body and pores are not hardly observed. Further, the sintered body has a bending strength of 1050 MPa and a toughness value at break of $K_{IC}=13$ MP.m$^{\frac{1}{2}}$.

Example 10

(1) A mixed powder of 90 g of $Si_3N_4$ powder, 7.0 g of $Y_2O_3$ powder, 2.0 g of $Al_2O_3$ powder and 3.0 g of $SiO_2$ powder is charged into a 90 ml of ethyl alcohol and then 1.5 ml of diethylamine is added, which are wet mixed in a ball mill for 72 hours.

(2) The mixture is heated to 60° C. to evaporate alcohol and charged into an aqueous solution of 5% polyethylene glycol, which is further mixed with stirring and dried and shaped into a green shaped body having a size of 45×20×5 mm$^3$.

(3) The green shaped body is heated to 500° C. in air at a temperature rising rate of 2° C./minute and calcined at 500° C. for 2 hours.

(4) The calcined material is heated to 1800° C. under a pressure of a nitrogen gas of 30 kgf/cm$^2$ at a temperature rising rate of 500° C./minute and held at 1800° C. for 10 minutes to obtain a sintered body.

The resulting sintered body is a dense sintered body and pores are not hardly observed. Further, the sintered body has a bending strength of 1100 MPa and a toughness value at break of $K_{IC}=13$ MP.m$^{\frac{1}{2}}$.

Example 11

(1) A mixed powder of 10 g of $Si_3N_4$ powder, 78.9 g of $Ho_2O_3$ powder, 10.65 g of $Al_2O_3$ powder and 0.45 g of $SiO_2$ powder is charged into a 90 ml of ethyl alcohol and then 1.5 ml of diethylamine is added, which are wet mixed in a ball mill for 72 hours.

(2) The mixture is heated to 60° C. to evaporate alcohol and charged into an aqueous solution of 5% polyethylene glycol, which is further mixed with stirring and dried and shaped into a green shaped body having a size of 45×20×5 mm$^3$.

(3) The green shaped body is heated to 500° C. in air at a temperature rising rate of 2° C./minute and calcined at 500° C. for 2 hours.

(4) The calcined material is heated to 1680° C. in a nitrogen gas at a temperature rising rate of 50° C./minute and held at 1680° C. for 20 minutes to obtain a sintered body.

The resulting sintered body is a dense sintered body and pores are not hardly observed. Further, the sintered body has a bending strength of 1050 MPa and a toughness value at break of $K_{IC}=14$ MP.m$^{\frac{1}{2}}$.

Example 12

(1) A mixed powder of 50 g of $Si_3N_4$ powder, 42.36 g of $Er_2O_3$ powder, 5.64 g of $Al_2O_3$ powder and 2.0 g of $SiO_2$ powder is charged into a 90 ml of ethyl alcohol and then 1.5 ml of diethylamine is added, which are wet mixed in a ball mill for 72 hours.

(2) The mixture is heated to 60° C. to evaporate alcohol and charged into an aqueous solution of 5% polyethylene glycol, which is further mixed with stirring and dried and shaped into a green shaped body having a size of 45×20×5 mm$^3$.

(3) The green shaped body is heated to 500° C. in air at a temperature rising rate of 2° C./minute and calcined at 500° C. for 2 hours.

(4) The calcined material is heated to ]800° C. in air at a temperature rising rate of 2° C./minute and held at 1800° C. for 10 minutes to obtain a sintered body.

The resulting sintered body is a dense sintered body and pores are not hardly observed. Further, the sintered body has a bending strength of 1100 MPa and a toughness value at break of $K_{IC}=15$ MP.m$^{\frac{1}{2}}$.

The $Si_3N_4$-(Ln—Al—Si) oxide sintered bodies obtained by the method of the invention are dense and have no pore and are constituted with particles having an average crystal grain size of not more than 30 μm. Furthermore, it is confirmed that the sintered body according to the invention has the strength and toughness value at break enough to be put into practical use, and particularly the toughness value at break is about 3 times that of the conventional SiC sintered body or the composite material thereof and the strength is 50% or more than that of the conventional one.

Example 13

(1) Into a mixed solution of 50 ml of distilled water and 4 ml of diethylamine is charged a mixed powder of 30 g of $Si_3N_4$ powder, 30 g of SiC whisker, 71.2 g of $Y_2O_3$ powder, 16.1 g of $Al_2O_3$ powder and 2.7 g of $SiO_2$ powder and 2 ml of diethylamine is further added, which is wet-mixed in a ball mill for 24 hours.

(2) Then, polyethylene glycol is added so as to provide a 10% solution and mixed with stirring for 3 hours, and thereafter the resulting suspension is shaped into a green shaped body through a slip cast process.

(3) The green shaped body is heated to 500° C. in air at a temperature rising rate of 2° C./minute and calcined at 500° C. for 2 hours.

(4) The calcined material is heated to 1775° C. under a pressure of a nitrogen gas of 10 kgf/cm$^2$ at a temperature rising rate of 50° C./minute and held at 1775° C. for 30 minutes to obtain a sintered body.

The resulting sintered body is a dense sintered body and pores are not hardly observed. Further, the sintered body has a bending strength of 1500 MPa and a toughness value at break of $K_{IC}=20$ MP.m$^{\frac{1}{2}}$.

Example 14

(1) Into a mixed solution of 90 ml of ethyl alcohol and 2 ml of diethylamine is charged a mixed powder of 10 g of SiC powder, 10 g of $Si_3N_4$ whisker, 69.42 g of $Yb_2O_3$ powder, 6.98 g of $Al_2O_3$ powder and 1.6 g of $SiO_2$ powder, which is wet-mixed in a ball mill for 72 hours.

(2) The mixture is heated to 60° C. to evaporate alcohol and charged into an aqueous solution of 5% polyethylene glycol, which is further mixed with stirring and dried and shaped into a green shaped body having a size of 45×20×5 mm$^3$.

(3) The green shaped body is heated to 500° C. in air at a temperature rising rate of 2° C./minute and calcined at 500° C. for 2 hours.

(4) The calcined material is heated to ]700° C. in a nitrogen gas at a temperature rising rate of 80° C./minute and held at 1700° C. for 5 minutes and further subjected to HIP treatment at 1650° C. under a pressure of a nitrogen gas of 100 kgf/cm$^2$ to obtain a sintered body.

The resulting sintered body is a dense sintered body and pores are not hardly observed. Further, the sintered body has a bending strength of 1300 MPa and a toughness value at break of $K_{IC}=18$ MP.m$^{\frac{1}{2}}$.

Example 15

(1) Into a mixed solution of 100 ml of distilled water and 1.5 ml of diethylamine is charged a mixed powder of 60 g of $Si_3N_4$ powder, 25 g of SiC whisker, 12.76 g of $Gd_2O_3$ powder, 1.79 g of $Al_2O_3$ powder and 0.45 g of $SiO_2$ powder, which is wet-mixed in a ball mill for 24 hours.

(2) Then, 12 g of polyethylene glycol is added and mixed with stirring for 3 hours, and thereater the resulting suspension is shaped into a green shaped body through a slip cast process.

(3) The green shaped body is heated to 500° C. in air at a temperature rising rate of 2° C./minute and calcined at 500° C. for 2 hours.

(4) The calcined material is heated to 1770° C. under a pressure of a nitrogen gas of 30 $kgf/cm^2$ at a temperature rising rate of 400° C./minute and held at 1770° C. for 20 minutes to obtain a sintered body.

The resulting sintered body is a dense sintered body and pores are not hardly observed. Further, the sintered body has a bending strength of 1400 MPa and a toughness value at break of $K_{IC}=18$ $MP.m^{\frac{1}{2}}$.

Example 16

(1) Into a mixed solution of 100 ml of distilled water and 2 ml of diethylamine is charged a mixed powder of 40 g of $Si_3N_4$ powder, 20 g of SiC whisker, 52.34 g of $Ho_2O_a$ powder, 3.75 g of $Al_2O_3$ powder and 0.6 g of $SiO_2$ powder, which is wet-mixed in a ball mill for 24 hours.

(2) Then, 12 g of polyethylene glycol is added and mixed with stirring for 3 hours, and thereafter the resulting suspension is shaped into a green shaped body through a slip cast process.

(3) The green shaped body is heated to 500° C. in air at a temperature rising rate of 2° C./minute and calcined at 500° C. for 2 hours.

(4) The calcined material is heated to 1700° C. under a pressure of a nitrogen gas of 10 $kgf/cm^2$ at a temperature rising rate of 50° C./minute and held at 1700° C. for 30 minutes to obtain a sintered body.

The resulting sintered body is a dense sintered body and pores are not hardly observed. Further, the sintered body has a bending strength of 1500 MPa and a toughness value at break of $K_{IC}=19$ $MP.m^{\frac{1}{2}}$.

Example 17

(1) Into a mixed solution of 100 ml of distilled water and 2 ml of diethylamine is charged a mixed powder of 50 g of $Si_3N_4$ powder, 20 g of SiC whisker, 25.65 g of $Sm_2O_3$ powder, 3.75 g of $Al_2O_3$ powder and 0.6 g of $SiO_2$ powder, which is wet-mixed in a ball mill for 24 hours.

(2) Then, 12 g of polyethylene glycol is added and mixed with stirring for 3 hours, and thereafter the resulting suspension is shaped into a green shaped body through a slip cast process.

(3) The green shaped body is heated to 500° C. in air at a temperature rising rate of 2° C./minute and calcined at 500° C. for 2 hours.

(4) The calcined material is heated to 1750° C. under a pressure of a nitrogen gas of 10 $kgf/cm^2$ at a temperature rising rate of 80° C./minute and held at 1750° C. for 30 minutes to obtain a sintered body.

The resulting sintered body is a dense sintered body and pores are not hardly observed. Further, the sintered body has a bending strength of 1100 MPa and a toughness value at break of $K_{IC}=15$ $MP.m^{\frac{1}{2}}$.

Example 18

(1) Into a mixed solution of 100 ml of distilled water and 2 ml of diethylamine is charged a mixed powder of 25 g of $Si_3N_4$ powder, 20 g of SiC whisker, 42.36 g of $Y_2O_3$ powder, 7.7 g of $Al_2O_3$ powder and 1.1 g of $SiO_2$ powder, which is wet-mixed in a ball mill for 24 hours.

(2) Then, 12 g of polyethylene glycol is added and mixed with stirring for 3 hours, and thereafter the resulting suspension is shaped into a green shaped body through a slip cast process.

(3) The green shaped body is heated to 500° C. in air at a temperature rising rate of 2° C./minute and calcined at 500° C. for 2 hours.

(4) The calcined material is heated to 1800° C. under a pressure of a nitrogen gas of 100 $kgf/cm^2$ at a temperature rising rate of 100° C./minute and held at 1800° C. for 10 minutes to obtain a sintered body.

The resulting sintered body is a dense sintered body and pores are not hardly observed. Further, the sintered body has a bending strength of 1200 MPa and a toughness value at break of $K_{IC}=15$ $MP.m^{\frac{1}{2}}$.

The $SiC$—$Si_3N_4$-mixed oxide sintered bodies obtained by the method of the invention are dense and have no pore and are constituted with particles having an average crystal grain size of not more than 30 μm. Furthermore, it is confirmed that the sintered body according to the invention has the strength and toughness value at break enough to be put into practical use. Moreover, the sintered bodies according to the invention can maintain the strength even at a high temperature, so that they are excellent ceramic materials capable of being used in air at not only room temperature but also high temperatures.

INDUSTRIAL APPLICABILITY

As mentioned above, according to the invention, SiC (or $Si_3N_4$)-mixed oxide sintered bodies having excellent toughness inherent to oxide sintered body and high-temperature strength inherent to SiC and/or $Si_3N_4$ and being dense and uniform in the structure having high strength and toughness can easily be obtained by firing a mixed oxide of rare earth oxide-alumina-silica and SiC and/or $Si_3N_4$ to control the crystal grain size of the sintered body to not more than 30 μm and prevent the formation of pores.

Therefore, the mixed oxide ceramic sintered bodies according to the invention are effectively used in wide fields such as engine parts, gas turbine blade, gas turbine parts, corrosion resistant equipment parts, crucible, parts for ball mill, heat exchanger for high temperature furnace, heat resistant material, heat resistant material for high flying body, burning tube, die cast parts, insulating material, material for nuclear fusion furnace, material for nuclear reactor, material for solar furnace, tools, heat insulating material, substrate for electron circuit, sealing material, parts for joint and valve, biomaterial for artificial bone, artificial toothroot or the like, inductance material, knife and cutter blade, sport goods, pump, nozzle, magnetic head, roller, guide, bearing, ferrule and others.

We claim:

1. A composite ceramic sintered body comprising:
   silicon carbide;
   a mixed oxide of $Ln_4Al_2O_9$ compound and silica or $LnAlO_3$ compound and silica; and having an average grain size of not more than 30 μm.

2. A composite ceramic sintered body according to claim 1, wherein said sintered body has an average crystal grain size of not more than 10 μm.

3. A composite ceramic sintered body according to claim 1, wherein Ln in said $Ln_4Al_2O_9$ compound is selected from the group consisting of Y, Sm, Eu, Gd, Tb, Dy, Ho Er, Tin, Yb, and Lu or a mixture thereof.

4. A composite ceramic sintered body according to claim 1, wherein Ln in said $LnAlO_3$ compound is selected from the group consisting of Y, La, Ce, Pr, Nd, Sm, Eu, Gd, Tb, Dy, Ho, Er, Tm, Yb, and Lu or a mixture thereof.

5. A composite ceramic sintered body according to claim 1, wherein said sintered body consists of silicon carbide and 5-95 wt % of said mixed oxide.

6. A composite ceramic sintered body according to claim 5, containing 90-5 wt % of silicon carbide.

7. A composite ceramic sintered body according to claim 5, wherein said sintered body consists of 80-20 wt % of silicon carbide and 20-80 wt % of said mixed oxide.

8. A composite ceramic sintered body according to claim 5, wherein said mixed oxide is a mixture of 99.9-90 wt % of $Ln_4Al_2O_9$ compound and 0.1-10 wt % of silica.

9. A method of producing a composite ceramic sintered body which comprises the steps of:
   (a) a step of mixing silicon carbide with a mixed oxide powder of $Ln_4Al_2O_9$ compound and silica or $LnAlO_3$ compound and silica:
   (b) a step of shaping the resulting mixed raw powder into a green shaped body;
   (c) a step of heating the resulting green shaped body in a non-oxidizing atmosphere at a temperature rising rate of 5°-2000° C./minute; and
   (d) a step of firing the green shaped body within a temperature range of 1500°-1900° C. for 0.1-600 minutes.

10. A method of producing a composite ceramic sintered body which comprises:
   (a) a step of mixing silicon carbide with a mixed oxide powder of $Ln_4Al_2O_9$ compound and silica or $LnAlO_3$compound and silica;
   (b) a step of shaping the resulting mixed raw powder into a green shaped body;
   (c) a step of heating the resulting green shaped body in a non-oxidizing atmosphere at a temperature rising rate of 5°-2000° C./minute; and
   (d) a step of firing the green shaped body within a temperature range of 1600°-2100° C. for 0.1-600 minutes.

11. A method of producing a composite ceramic sintered body which comprises:
   (a) a step of mixing silicon carbide and silicon nitride with a mixed oxide powder of $Ln_4Al_2O_9$ compound and silica or $LnAlO_3$ compound and silica;
   (b) a step of shaping the resulting mixed raw powder into a green shaped body of a given shape;
   (c) a step of heating the resulting green shaped body in a non-oxidizing atmosphere at a temperature rising rate of 5°-2000° C./minute; and
   (d) a step of firing the green shaped body within a temperature range of 1600°-2100° C. for 0.1-600 minutes.

12. The method according to claim 9, wherein said silicon carbide is powder or whisker.

13. The method according to claim 9, wherein said $Ln_4Al_2O_9$ compound is selected from the group consisting of Y, Sin, Eu, Gd, Tb, Dy, Ho, Er, Tm, Yb, and Lu or a mixture thereof.

14. The method according to claim 9, wherein said Ln in said $LnAlO_3$ compound is selected from the group consisting of Y, La, Ce, Pr, Nd, Sm, Eu, Gd, Tb, Dy, Ho, Er, Tm, Yb, Lu or a mixture thereof.

15. The method according to claim 9, wherein said sintered body consists of 95-5 wt % of silicon carbide and 5-95 wt % of a mixed oxide.

16. The method according to 15, wherein said sintered body consists of 80-20 wt % of non-oxide and 20-80 wt % of mixed oxide.

17. The method according to claim 15, wherein said mixed oxide is a mixture of 99.9-90 wt % of $Ln_4Al_2O_9$ compound and 0.1-10 wt % of silica.

18. The method according to claim 11, wherein said non-oxide is a mixture of 90-5 wt % of silicon carbide and 10-95 wt % of silicon nitride.

19. The method according to claim 10, wherein said firing is conducted at a temperature rising rate of 50°-1000° C./minute, a firing-temperature of 1650°-2000° C. and a firing time of 1-60 minutes.

20. A composite ceramic according to claim 5, wherein said mixed oxide is a mixture of 99.9-90 wt % of $Ln_4Al_2O_9$ compound or $LnAlO_3$ compound and 1-10 wt % of silica.

21. A composite ceramic sintered body according to claim 8, wherein Ln in said $LnAlO_3$ compound is selected from the group consisting of Y, La, Ce, Pr, Nd, Sm, Eu, Gd, Tb, Dy, Ho, Er, Tm, Yb and Lu, or a mixture thereof.

22. A composite ceramic sintered body according to claim 5, wherein said sintered body consists of 80-20 wt % of silicon carbide and 20-80 wt % of said mixed oxide.

23. A composite ceramic sintered body according to claim 5, wherein said mixed oxide is a mixture of 99.9-90 wt % of $Ln_4Al_2O_9$ compound and 0.1-10 wt % of silica.

24. The method according to claim 9, wherein said mixed oxide consists of 64.9-89.9 wt % of rare earth oxide, 10-35 wt %, of alumina and 0.1-10 wt % of silica.

25. The method according to claim 15, wherein said mixed oxide consists of 99.9-90 wt % of $LnAlO_3$ compound and 0.1-10 wt % of silica.

26. The method according to claim 15, wherein said sintered body contains 90-5 wt % of silicon carbide.

* * * * *